(12) United States Patent
Roessle

(10) Patent No.: US 12,025,205 B2
(45) Date of Patent: Jul. 2, 2024

(54) HYDRAULIC REBOUND STOP PRESSURE RELIEF SYSTEM

(71) Applicant: DRiV Automotive Inc., Southfield, MI (US)

(72) Inventor: Matthew L. Roessle, Temperance, MI (US)

(73) Assignee: DRiV Automotive Inc., Northville, MI (US)

( * ) Notice: Subject to any disclaimer, the term of this patent is extended or adjusted under 35 U.S.C. 154(b) by 513 days.

(21) Appl. No.: 17/237,412

(22) Filed: Apr. 22, 2021

(65) Prior Publication Data
US 2022/0341481 A1 Oct. 27, 2022

(51) Int. Cl.
*F16F 9/48* (2006.01)
*B60G 13/08* (2006.01)
(Continued)

(52) U.S. Cl.
CPC ............ *F16F 9/483* (2013.01); *F16F 9/185* (2013.01); *F16F 9/3235* (2013.01); *F16F 9/34* (2013.01); *F16F 9/366* (2013.01); *F16F 9/369* (2013.01); *F16F 9/516* (2013.01); *F16K 15/044* (2013.01); *B60G 13/08* (2013.01); *B60G 17/08* (2013.01);
(Continued)

(58) Field of Classification Search
CPC .......... F16F 9/483; F16F 9/185; F16F 9/3235; F16F 9/34; F16F 9/366; F16F 9/369; F16F 9/516; F16F 2222/12; F16F 2228/066; F16F 2230/0052; F16F 2230/42; F16F 2232/08; F16F 2234/02; B60G 2800/162; B60G 2600/21; B60G 2500/11; B60G 2206/41;
(Continued)

(56) References Cited

U.S. PATENT DOCUMENTS 2,191,611 A * 2/1940 Eshbaugh ............. F16K 15/044
123/41.1
2,722,288 A * 11/1955 Steinbauer ................ F16F 9/49
267/221

(Continued)

FOREIGN PATENT DOCUMENTS

CN 106122344 B 4/2019
EP 2302252 B1 11/2012
(Continued)

*Primary Examiner* — Robert A. Siconolfi
*Assistant Examiner* — James K Hsiao
(74) *Attorney, Agent, or Firm* — Harness, Dickey & Pierce, P.L.C.

(57) ABSTRACT

A damper comprises a pressure tube extending longitudinally between a first pressure tube end and a second pressure tube end, a piston arranged in sliding engagement inside the pressure tube, a piston rod coupled to the piston, a hydraulic rebound stop positioned in a first working chamber and including a sealing ring circumferentially extending around the piston rod and within the pressure tube. The sealing ring at least partially defining a high-pressure region within the pressure tube during a rebound stroke the damper further comprising a pressure relief valve in fluid communication with the high-pressure region. The pressure relief valve being operable to allow pressurized fluid from the high-pressure region to pass therethrough once a predefined pressure threshold has been reached.

15 Claims, 11 Drawing Sheets

(51) Int. Cl.
- *F16F 9/18* (2006.01)
- *F16F 9/32* (2006.01)
- *F16F 9/34* (2006.01)
- *F16F 9/36* (2006.01)
- *F16F 9/516* (2006.01)
- *F16K 15/04* (2006.01)
- *B60G 17/08* (2006.01)

(52) U.S. Cl.
CPC ...... *B60G 2202/24* (2013.01); *B60G 2204/62* (2013.01); *B60G 2206/41* (2013.01); *B60G 2500/11* (2013.01); *B60G 2600/21* (2013.01); *B60G 2800/162* (2013.01); *F16F 2222/12* (2013.01); *F16F 2228/066* (2013.01); *F16F 2230/0052* (2013.01); *F16F 2230/42* (2013.01); *F16F 2232/08* (2013.01); *F16F 2234/02* (2013.01)

(58) Field of Classification Search
CPC ............ B60G 2204/62; B60G 2202/24; B60G 17/08; B60G 13/08; F16K 15/044
See application file for complete search history.

(56) References Cited

U.S. PATENT DOCUMENTS

| | | | | |
|---|---|---|---|---|
| 3,101,739 | A * | 8/1963 | Pribonic | F16K 15/044 251/86 |
| 4,045,008 | A * | 8/1977 | Bauer | F16F 9/49 267/64.11 |
| 4,345,748 | A * | 8/1982 | Wossner | F16F 9/483 267/226 |
| 4,446,886 | A * | 5/1984 | Taylor | F16K 15/044 137/539.5 |
| 5,988,330 | A * | 11/1999 | Morris | F16F 9/466 188/319.1 |
| 6,193,236 | B1 * | 2/2001 | Helpap | F16J 9/206 277/494 |
| 9,593,697 | B2 * | 3/2017 | Baalmann | F16F 9/49 |
| 9,605,726 | B2 | 3/2017 | Baldoni et al. | |
| 9,651,110 | B2 * | 5/2017 | Takeno | F16F 9/49 |
| 9,835,220 | B2 * | 12/2017 | Kontny | F16F 9/49 |
| 9,909,638 | B2 * | 3/2018 | Chyla | F16F 9/36 |
| 10,208,830 | B2 * | 2/2019 | Bruno | F16F 9/185 |
| 10,533,624 | B2 * | 1/2020 | Ishimaru | F16F 9/49 |
| 10,830,303 | B2 * | 11/2020 | Kontny | F16F 9/585 |
| 10,989,268 | B2 * | 4/2021 | Oliveira | F16F 9/585 |
| 11,434,969 | B2 * | 9/2022 | Maton | F16F 9/0227 |
| 11,506,253 | B2 * | 11/2022 | Breese | F16F 9/3221 |
| 11,543,000 | B2 * | 1/2023 | Kontny | F16F 9/49 |
| 11,668,367 | B2 * | 6/2023 | Kasprzyk | F16F 9/185 188/284 |
| 2002/0053493 | A1 * | 5/2002 | Sintorn | F16F 9/512 188/304 |
| 2005/0051218 | A1 * | 3/2005 | Oba | F16K 11/04 137/539.5 |
| 2006/0124170 | A1 * | 6/2006 | Schaefer | F04B 49/10 417/435 |
| 2006/0272711 | A1 * | 12/2006 | Talaski | F16K 15/044 137/539 |
| 2010/0051119 | A1 * | 3/2010 | Klein | F16K 17/0406 137/540 |
| 2012/0090931 | A1 | 4/2012 | Krazewski et al. | |
| 2014/0360353 | A1 * | 12/2014 | Baalmann | F16F 9/49 92/143 |
| 2015/0090548 | A1 * | 4/2015 | Yamanaka | F16F 9/3271 29/434 |
| 2015/0369367 | A1 * | 12/2015 | Kuroki | F16J 15/30 277/543 |
| 2017/0009840 | A1 * | 1/2017 | Hertz | F16F 9/49 |
| 2018/0058533 | A1 * | 3/2018 | Bruno | F16F 9/185 |
| 2018/0112784 | A1 * | 4/2018 | Obermark | F16K 15/046 |
| 2018/0119770 | A1 * | 5/2018 | Bruno | F16F 9/49 |
| 2018/0223941 | A1 * | 8/2018 | Grzesik | F16F 9/483 |
| 2019/0040925 | A1 * | 2/2019 | Alzer | F16F 9/483 |
| 2019/0128361 | A1 * | 5/2019 | Rösseler | F16F 9/5126 |
| 2019/0186584 | A1 * | 6/2019 | Flacht | F16F 9/165 |
| 2020/0149608 | A1 * | 5/2020 | Maeda | F16F 9/182 |
| 2020/0173513 | A1 * | 6/2020 | Woenarta | F16F 9/44 |
| 2021/0010559 | A1 | 1/2021 | Oliveira et al. | |
| 2021/0018059 | A1 * | 1/2021 | Sankaran | B60G 13/08 |
| 2021/0088096 | A1 * | 3/2021 | Baldoni | F16F 9/185 |

FOREIGN PATENT DOCUMENTS

| | | |
|---|---|---|
| KR | 20050107663 A | 11/2005 |
| WO | WO-2018224961 A1 | 12/2018 |

* cited by examiner

HYDRAULIC REBOUND STOP PRESSURE RELIEF SYSTEM

FIELD

The present disclosure relates generally to dampers for vehicle suspension systems and more particularly to dampers with hydraulic rebound stops.

BACKGROUND

The statements in this section merely provide background information related to the present disclosure and may not constitute prior art.

In general, dampers are used to absorb and dissipate the impact and rebound movement of a vehicle's suspension system and keep the vehicle's tires in contact with the ground. Dampers are typically installed alongside a spring (as a stand-alone shock absorber) or inside a spring (as part of a coil-over shock and strut assembly) and placed in front and rear suspension systems. The damper is attached to a frame member or other sprung component of the vehicle by an upper mount and is attached to a suspension member or other unsprung component of the suspension by a lower mount.

Conventional hydraulic dampers include a pressure tube, which acts as a hydraulic cylinder. A piston is slidably disposed within the pressure tube with the piston separating the interior of the pressure tube into two fluid chambers. A piston rod is connected to the piston and extends out of one end of the pressure tube where it is adapted for attachment to a sprung or unsprung component of the vehicle. The opposite end of the pressure tube is adapted for attachment to the other sprung or unsprung component of the vehicle. A first valve system, typically incorporated within the piston, functions to create a damping load during the damper's extension (i.e., rebound stroke). A second valve system, typically incorporated within the piston in a mono-tube damper and in a base valve assembly in a dual-tube damper, functions to create a damping force during the damper's compression stroke.

Many hydraulic dampers include features designed to prevent the piston and piston rod from coming to an abrupt stop at the end of a rebound stroke. In some instances, a simple bumper is used to cushion the piston and the piston rod when they reach the end of a rebound stroke. More sophisticated rebound stops have been developed that utilize a hydraulic plunger to slow the movement of the piston and the piston rod at the end of a rebound stroke. Some existing hydraulic rebound stop systems may generate internal pressures that exceed desired magnitudes. Accordingly, a need exists for an improved hydraulic rebound stop that can be easily incorporated into existing passive damper designs and provide a pressure relief feature without requiring significant changes or modifications to the damper.

SUMMARY

A damper comprises a pressure tube extending longitudinally between a first pressure tube end and a second pressure tube end, a piston arranged in sliding engagement inside the pressure tube, a piston rod coupled to the piston, a hydraulic rebound stop positioned in a first working chamber and including a sealing ring circumferentially extending around the piston rod and within the pressure tube. The sealing ring at least partially defining a high-pressure region within the pressure tube during a rebound stroke the damper further comprising a pressure relief valve in fluid communication with the high-pressure region. The pressure relief valve being operable to allow pressurized fluid from the high-pressure region to pass therethrough once a predefined pressure threshold has been reached.

The present disclosure also describes a damper comprising a pressure tube extending longitudinally between a first pressure tube end and a second pressure tube end. The pressure tube defines a first portion having a first inner diameter and a second portion having an inner diameter sized less than the first portion. A piston is arranged in sliding engagement inside the pressure tube such that the piston divides the pressure tube into a first working chamber and a second working chamber. A piston rod is coupled to the piston to form a piston rod assembly. A rod guide is coupled to the first pressure tube and the piston rod extends through an aperture in the rod guide. A hydraulic rebound stop is positioned in the first working chamber and includes a sealing ring circumferentially extending around the piston rod and within the pressure tube. The sealing ring at least partially defines a high-pressure region within the second portion pressure tube during a rebound stroke. A pressure relief valve is in fluid communication with the high-pressure region. The pressure relief valve is positioned within the rod guide and operable to allow pressurized fluid from the high-pressure region to pass therethrough once a predefined pressure threshold has been reached.

DETAILED DESCRIPTION

Figure 1:
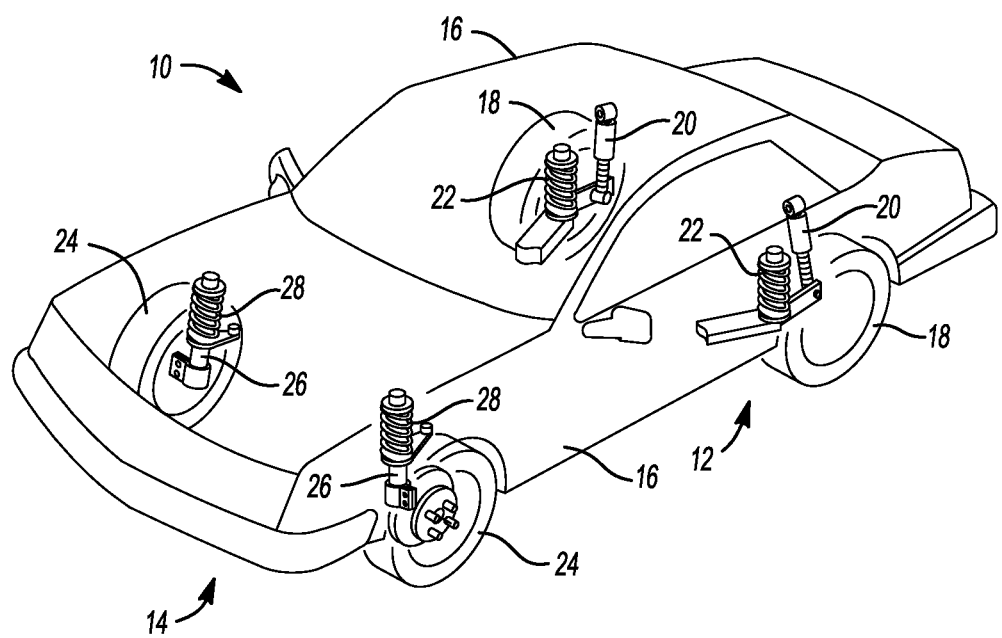
FIG. 1 is a perspective view of an exemplary vehicle equipped with a damper constructed in accordance with the teachings of the present disclosure.

Referring to the Figures, wherein like numerals indicate corresponding parts throughout the several views, a damper 20 is illustrated.

Example embodiments will now be described more fully with reference to the accompanying drawings. Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Referring now to FIG. 1, a vehicle 10 includes a rear suspension 12, a front suspension 14, and a body 16. The rear suspension 12 has a transversely extending rear axle assembly (not shown) to which rear wheels 18 of the vehicle 10 are mounted. The rear axle assembly is operatively connected to the body 16 by a pair of dampers 20 and a pair of helical coil springs 22. Similarly, the front suspension 14 includes a transversely extending front axle assembly (not shown) to which front wheels 24 of the vehicle 10 are mounted. The front axle assembly is operatively connected to the body 16 by a second pair of dampers 26 and a pair of helical coil springs 28. The dampers 20, 26 dampen the relative motion of the unsprung portion (e.g., the front and rear axle assemblies) and the sprung portion (e.g., the body 16) of the vehicle 10. While the vehicle 10 has been depicted as a passenger car having front and rear axle assemblies, the dampers 20, 26 may be used with other types of vehicles or machinery, or in other types of applications such as vehicles incorporating independent front and/or independent rear suspension systems. Further, the term "damper" as used herein is meant to refer to shock absorbers and shock absorber systems in general and thus will include MacPherson struts. It should also be appreciated that the scope of the subject disclosure is intended to include the stand-alone dampers 20 and the coil-over dampers 26.

Figure 2:
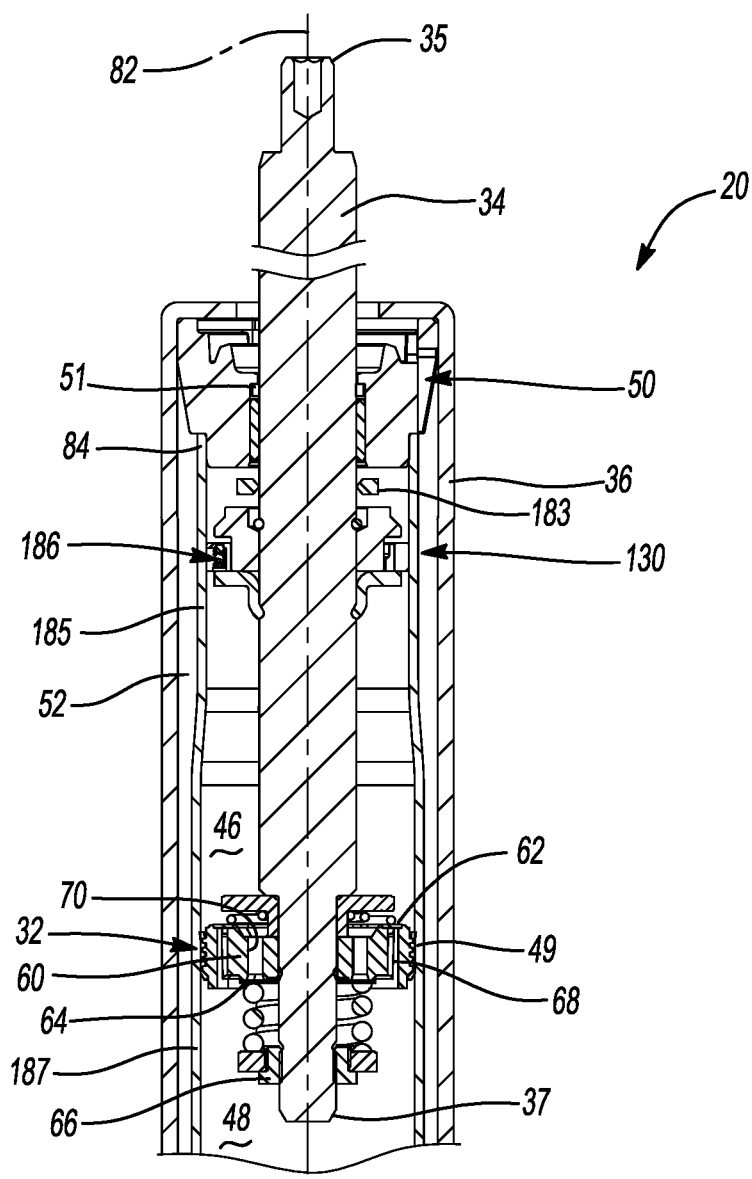
FIG. 2 is a fragmentary cross-sectional side view of a damper.
Figure 2:
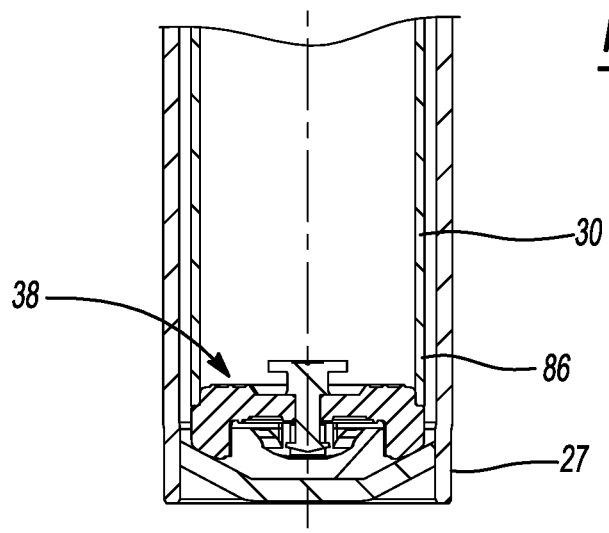

With reference to FIG. 2, the damper 20 includes a pressure tube 30, a piston 32, a piston rod 34, a reserve tube 36, and a base valve assembly 38. The piston 32 is slidably disposed within the pressure tube 30 and divides the pressure tube 30 into a first working chamber 46 and a second working chamber 48. A seal 49 is disposed between the piston 32 and the pressure tube 30 to permit sliding movement of the piston 32 with respect to the pressure tube 30 without generating undue frictional forces as well as sealing the first working chamber 46 from the second working chamber 48. The piston rod 34 extends between a first piston rod end 35 and a second piston rod end 37. The piston rod 34 is attached (i.e., coupled) to the piston 32. The piston rod 34 extends through the first working chamber 46 and through a rod guide assembly 50. Accordingly, the first piston rod end 35 is always positioned outside the pressure tube 30. A piston rod seal 51 seals the interface between the rod guide assembly 50 and the piston rod 34.

The first piston rod end 35 is adapted to be secured to either a sprung or unsprung component of a vehicle (not shown). Because the piston rod 34 extends only through the first working chamber 46 and not the second working chamber 48, extension and compression movements of the piston 32 with respect to the pressure tube 30 causes a difference in the amount of fluid displaced in the first working chamber 46 compared to the amount of fluid displaced in the second working chamber 48. The difference in the amount of fluid displaced is known as the "rod volume" and during extension movements it flows through the base valve assembly 38. During a compression movement of the piston 32 with respect to the pressure tube 30, first compression valve assembly 62 within the piston 32 allows fluid to flow from the second working chamber 48 to the first working chamber 46 while the "rod volume" of fluid flow flows through the base valve assembly 38.

The base valve assembly 38 is positioned at a base end 27 of the damper 20 which is adapted to be secured to either a sprung or unsprung component of the vehicle (not shown)

and controls the flow of fluid between the second working chamber 48 and a reservoir chamber 52 positioned radially between the pressure tube 30 and the reserve tube 36. When the damper 20 extends in length, an additional volume of fluid is needed in the second working chamber 48 due to the rod volume and fluid will flow from the reservoir chamber 52 to the second working chamber 48 through the base valve assembly 38. When the damper 20 compresses in length, an excess of fluid must be removed from the second working chamber 48 due to the rod volume. Thus, fluid will flow from the second working chamber 48 to the reservoir chamber 52 through the base valve assembly 38.

The piston 32 comprises a piston body 60, a first compression valve assembly 62, a first extension valve assembly 64, and a nut 66. The nut 66 is threaded onto the piston rod 34 to secure the first compression valve assembly 62, the piston body 60, and the first extension valve assembly 64 to the piston rod 34. The piston body 60 defines a first plurality of compression passages 68 and a first plurality of extension passages 70.

The pressure tube 30 has a cylindrical shape, which extends annularly about a damper axis 82 and longitudinally between a first pressure tube end 84 and a second pressure tube end 86. The first pressure tube end 84 mates with the rod guide assembly 50 and the base valve assembly 38 mates with the second pressure tube end 86. It should be appreciated that when the terms "longitudinal" and "longitudinally" are used herein, they are meant to describe structures, dimensions, directions, or movements that are substantially parallel to the damper axis 82. Although a dual-tube damper 20 is illustrated in FIG. 2, it should be appreciated that the subject disclosure is equally applicable to mono-tube dampers.

Figure 3:
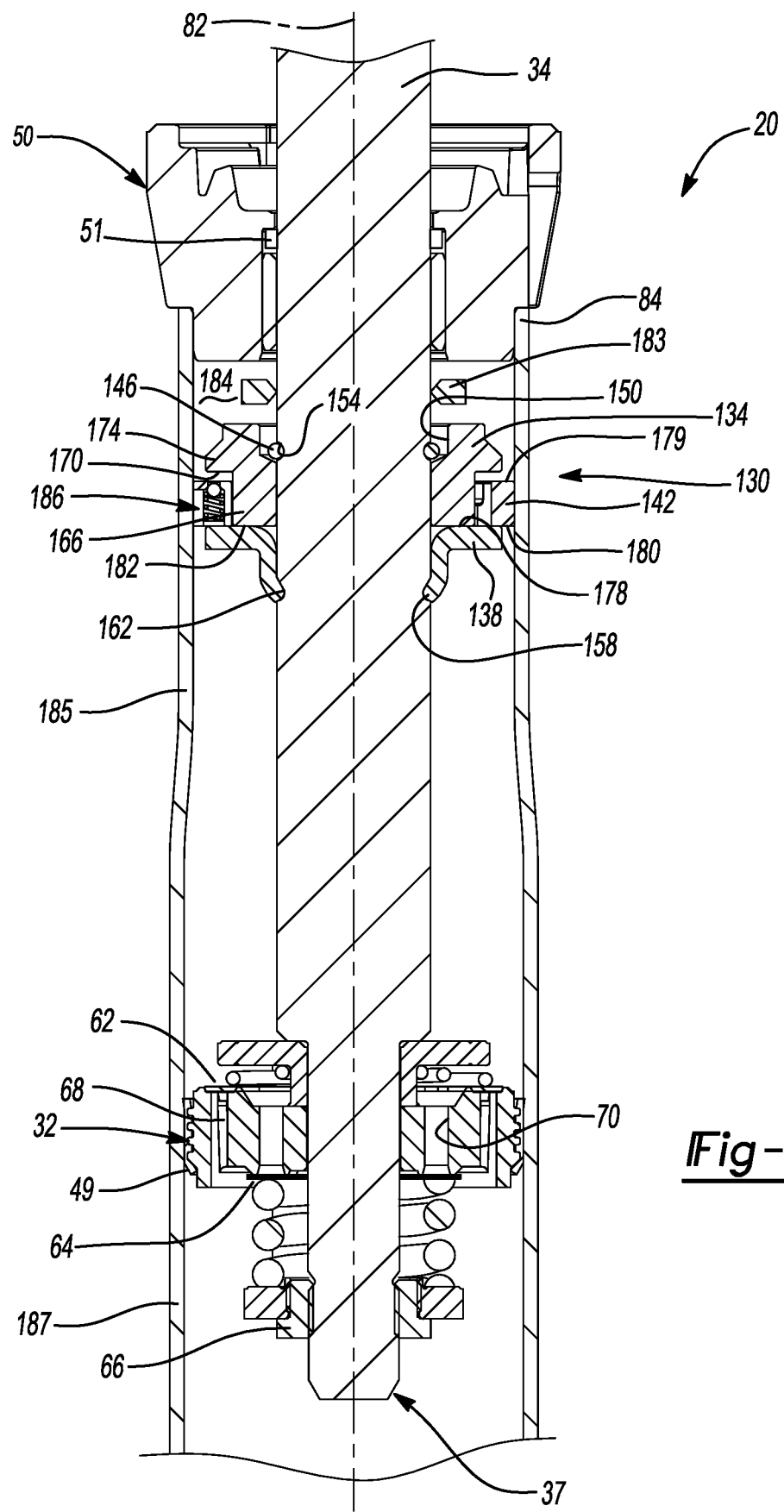
FIG. 3 is an enlarged fragmentary cross-sectional view of the damper.
Figure 4:
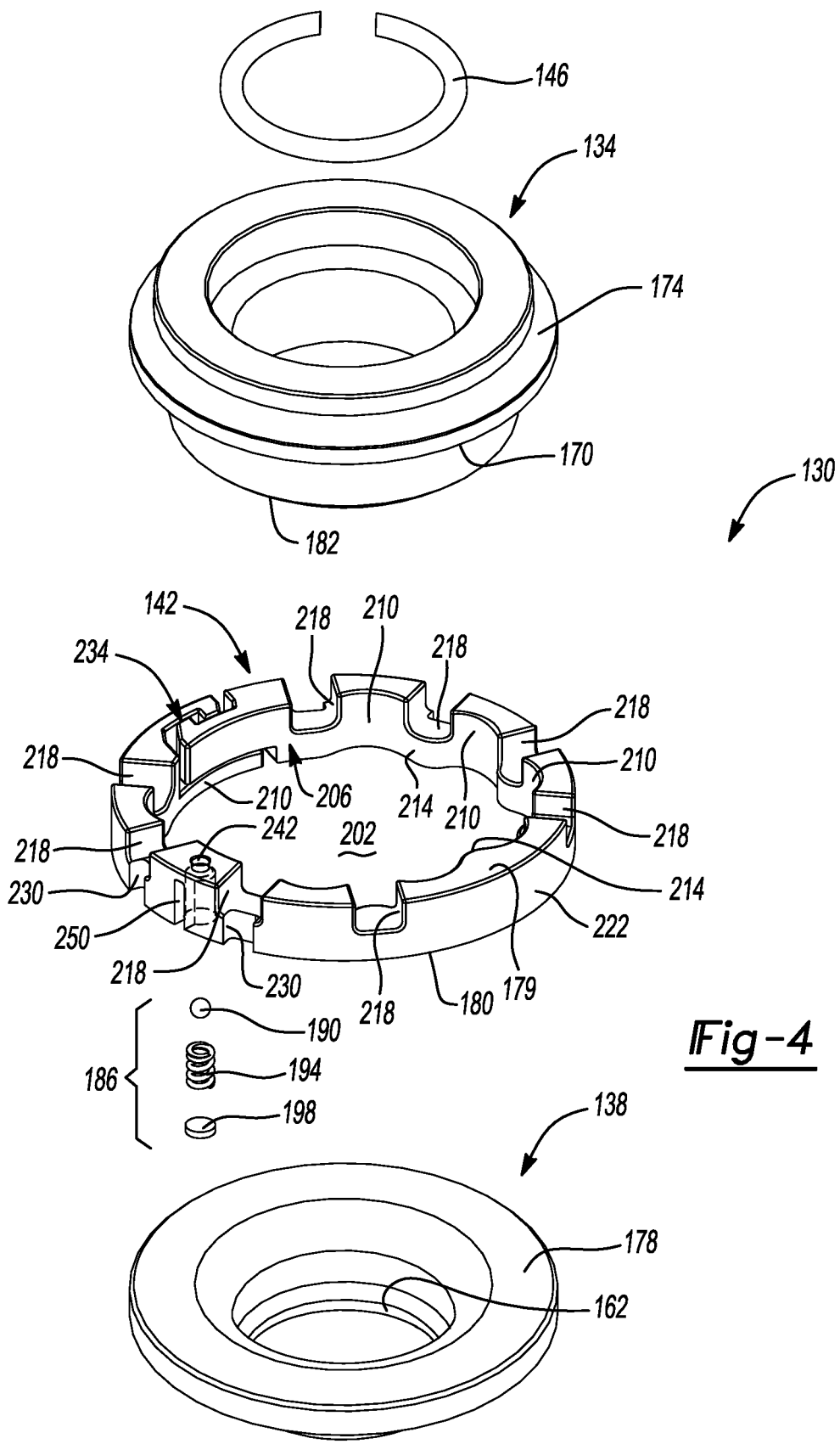
FIG. 4 is a partial exploded perspective view of a portion of the damper.

Referring to FIGS. 3 and 4, damper 20 includes a hydraulic rebound stop 130 positioned proximate rod guide assembly 50. Hydraulic rebound stop 130 includes a first collar 134, a second collar 138, and a sealing ring 142 longitudinally positioned between first collar 134 and second collar 138. A retaining ring 146 is positioned within a recess 150 of first collar 134 and within a ring groove 154 of piston rod 34 to restrict longitudinal movement of first collar 134 relative to piston rod 34. First collar 134 may be formed from any number of materials including metal, sintered powdered metal, or plastic such as nylon 6/6. Second collar 138 is preferable constructed from metal and includes a radially inwardly extending tang 158 positioned within a retaining groove 162 formed on piston rod 34. Tang 158 may be mechanically deformed or crimped to piston rod 34. Accordingly, second collar 138 is also restricted from longitudinal movement relative to piston rod 34 and first collar 134.

Sealing ring 142 circumferentially encompasses a skirt portion 166 of first collar 134 in a slip fit manner such that sealing ring 142 is free to longitudinally translate between a land 170 formed on a radially extending flange 174 of first collar 134 and a stop face 178 of second collar 138. An end face 182 of first collar 134 is positioned in engagement with stop face 178 of second collar 138. Sealing ring 142 defines an axial extent ranging from a first substantially planar surface 179 to a second substantially second planar surface 180. Land 170 is spaced apart from stop face 178 a distance greater than the longitudinal extent of sealing ring 142 to allow sealing ring 142 a range of longitudinal or axial displacement depending on the mode of operation as will be described in greater detail. Sealing ring 142 may be an injection molded component constructed from a plastic material such as glass fiber reinforced nylon 6/6. It should be appreciated that various exemplary embodiments of hydraulic rebound stop 130 are depicted and described in United States Patent Application Publication Number US 2021/0010559 A1 which is hereby incorporated by reference in its entirety. Furthermore, an optional rebound bumper 183 is provided between rod guide assembly 50 and hydraulic rebound stop 130. Rebound bumper 183 may be formed from an elastomeric material and function as a noise reducing member during full extension or rebound strokes. Rebound bumper assures that first collar 134 does not impact rod guide assembly 50 during such events.

The hydraulic rebound stop of the present disclosure functions by creating a pressure differential within first working chamber 46 during certain portions of the rebound stroke. A high-pressure region 184 is created when hydraulic rebound stop 130 enters a reduced diameter portion 185 of pressure tube 30 having a reduced diameter in comparison to a main portion 187 of pressure tube 30. The reduced diameter may be generated by various processes, such as swaging. Alternatively, pressure tube 30 may include a sleeve insert (not shown) to define a reduced inner diameter instead of the contiguous wall design depicted in the figures. It should be appreciated that sealing ring 142 does not define high-pressure region 184 when positioned outside of the reduced diameter portion in the Hydraulic rebound stop is equipped with a pressure relief valve 186 located in one of sealing ring 142 and rod guide assembly 50. FIGS. 3-8 depict sealing ring 142 including pressure relief valve 186. Pressure relief valve 186 may be configured as a check valve including a check ball 190, a valve spring 194, and a retainer 198. Depending on the direction of travel of piston rod 34 relative to pressure tube 30, sealing ring 142 is urged into engagement with either land 170 or stop face 178. The number and the configuration of passageways allowing flow to pass through or around sealing ring 142 vary based on the position of sealing ring 142 in relation to the first and second collars 134, 138. To achieve this goal, sealing ring 142 includes a variety of geometrical features.

With reference to FIG. 4, sealing ring 142 includes an opening 202 defined by an inner surface 206 that is in receipt of piston rod 34. Inner surface 206 faces piston rod 34 and includes a plurality of concave surfaces 210 and a plurality of convex surfaces 214. Each of the plurality of concave surfaces 210 is located adjacent to the corresponding convex surface 214 of the plurality of convex surfaces 214. As such, inner surface 206 includes alternating concave and convex surfaces 210, 214. A total number of concave and convex surfaces 210, 214 may vary as per system requirements. Each convex surface 214 is positioned proximate piston rod 34 while each concave surface 210 is curved away from piston rod 34. A space is defined between each concave surface 210 and piston rod 34. Sealing ring 142 also includes a plurality of circumferentially spaced apart channels 218 radially extending from inner surface 206 to an outer surface 222.

Figure 5:
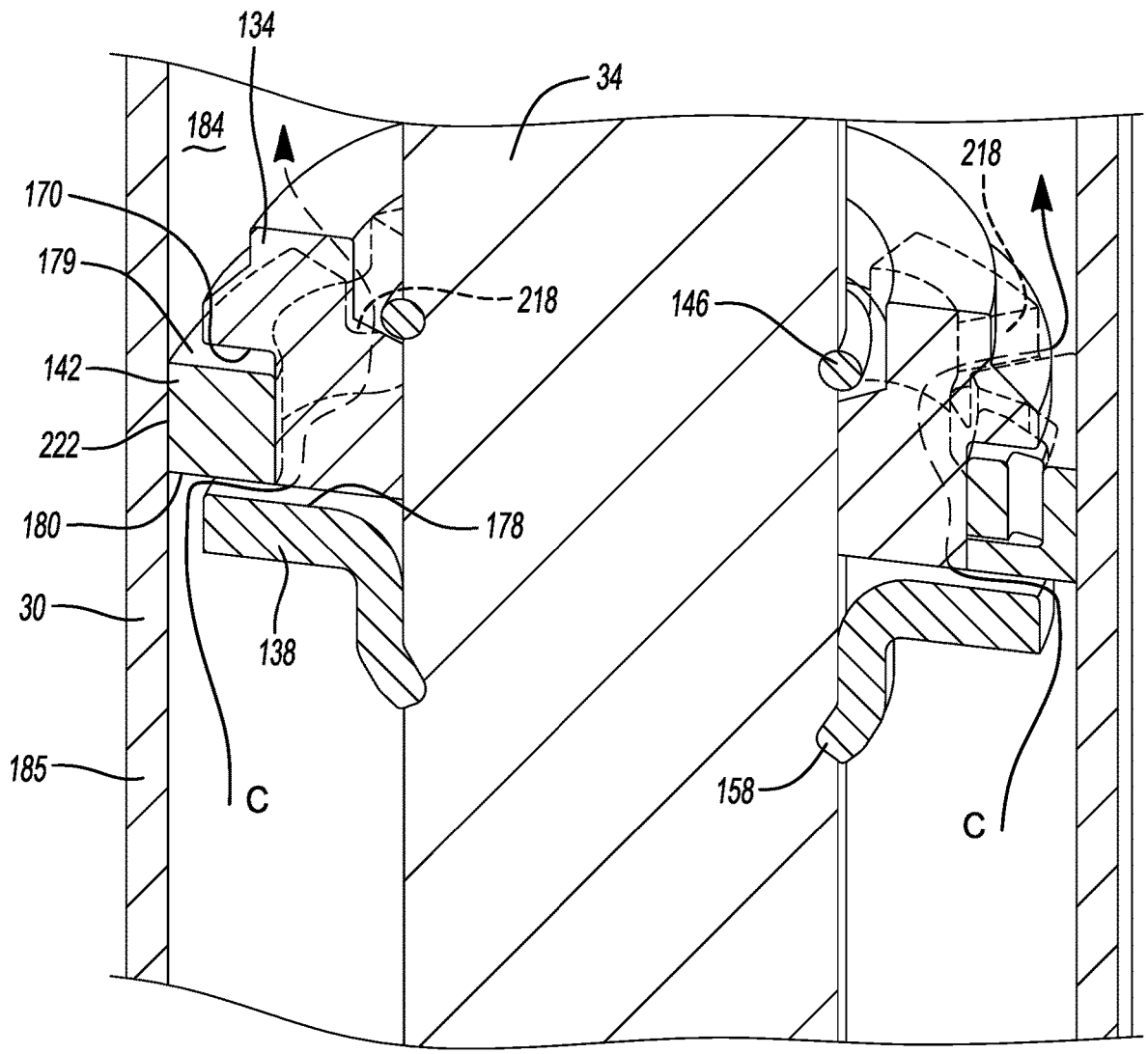
FIG. 5 is a fragmentary cross-sectional perspective view of the damper operating in compression.
Figure 7:
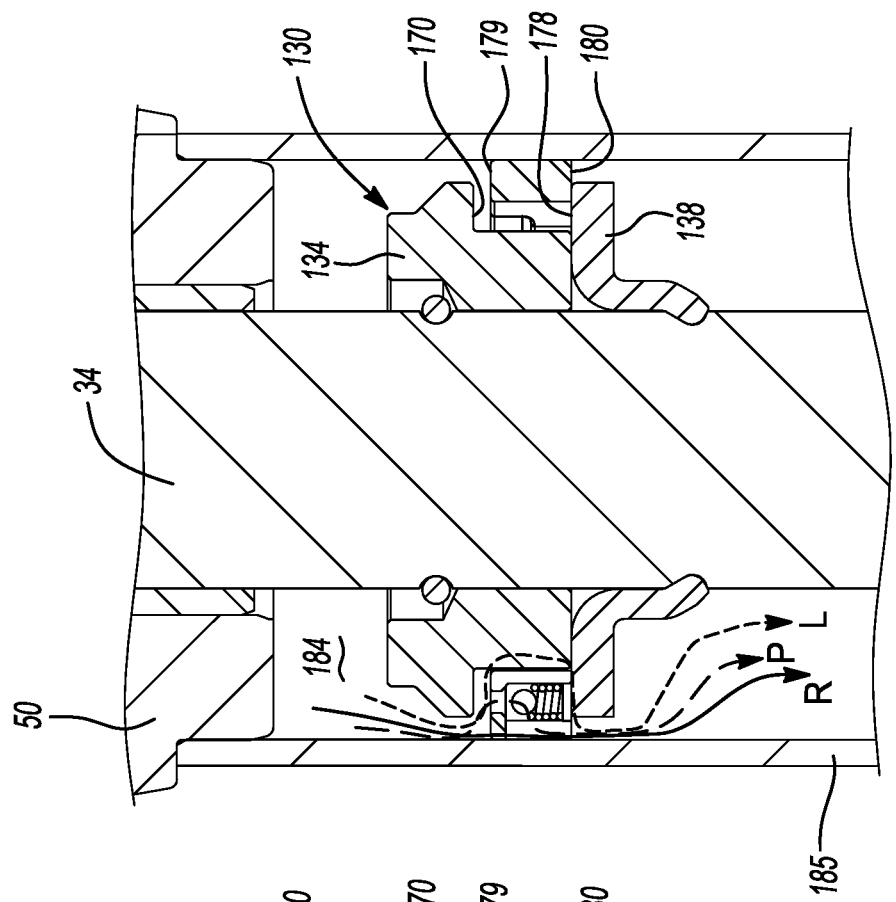
FIG. 7 is a fragmentary cross-sectional side view of the damper operating in a rebound stroke at a pressure exceeding the pressure threshold.

Referring now to FIG. 5, a fragmentary sectional view of the damper 20 during the compression stroke is illustrated. The figure depicts hydraulic rebound stop 130 positioned within the reduced diameter portion of pressure tube 30. During the compression stroke at this location, sealing ring 142 is urged into contact with first collar 134 and spaced apart from second collar 138 due to the pressure differential generated. At this time, first planar surface 179 is in direct engagement with land 170. Outer surface 222 of sealing ring 142 is slidingly and sealingly engaged with pressure tube 30. As illustrated, fluid flows along a compression flow path "C"

between second collar 138 and pressure tube 30, between second planar surface 180 of sealing ring 142 and stop face 178 of second collar 138, through the spaces between concave surfaces 210 piston rod 34 and through channels 218. Channels 218 extend a radial extent greater than the outer diameter of radially extending flange 174 of first collar 134. Replenishment flow is controlled by the quantity, size and shape of the spaces between concave surfaces 210 and piston rod 34, the axial spacing between sealing ring 142 and second collar 138, the annular gap between the first collar 134 and pressure tube 30, as well as the annular gap between second collar 138 and pressure tube 30. It should be appreciated that pressure relief valve 186 remains closed during the entire compression stroke. The pressure differential across sealing ring 142 is not acting in a direction to open pressure relief valve 186.

Figure 6:
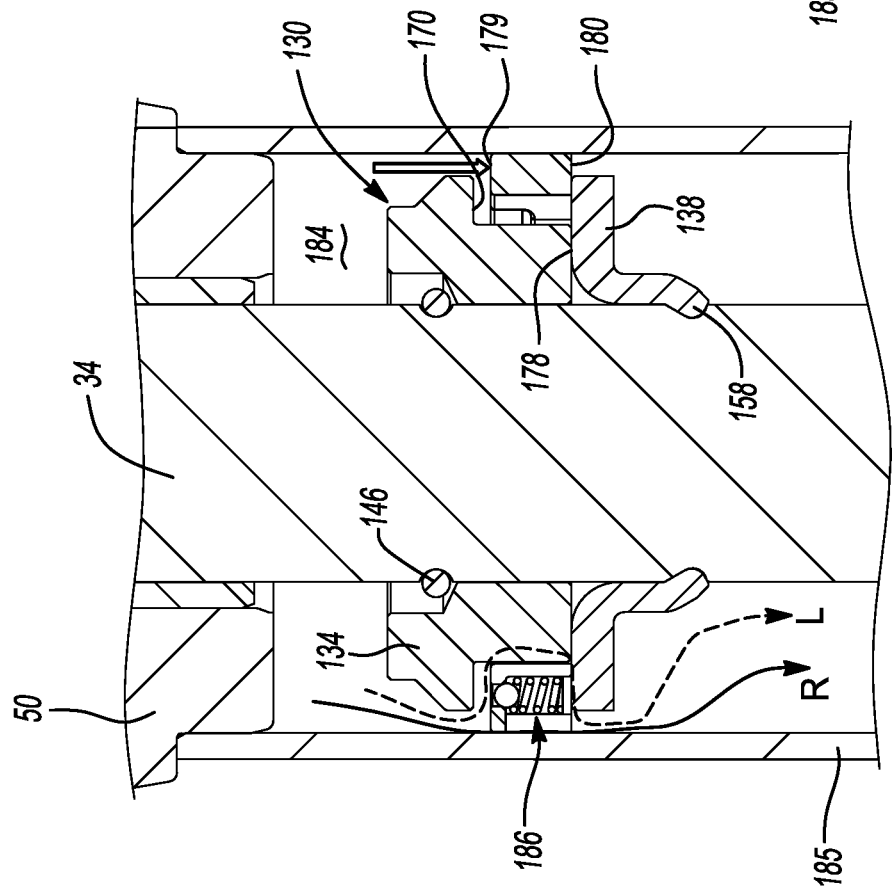
FIG. 6 is a fragmentary cross-sectional view of the damper operating during a rebound stroke below the pressure threshold.

Referring now to FIG. 6, a cross-sectional view of the damper 20 during the rebound stroke is illustrated. During the rebound stroke when pressure within high-pressure region 184 is below a predetermined threshold, sealing ring 142 is urged into contact with second collar 138 and spaced apart from first collar 134. Fluid flows along a first or rebound flow path "R" and a second or leak path "L" from high-pressure region 184 to the opposite side of hydraulic rebound stop 130. Sealing ring 142 includes a plurality of circumferentially spaced apart grooves 230 in communication with some, but possibly not all, channels 218. The majority of fluid flow occurs along path R between pressure tube 30 and sealing ring 142 through grooves 230. A minimized flow occurs along leak path L from high-pressure region 184 between flange 174 and sealing ring 142, through a portion of the spaces between concave surfaces 210 piston rod 34, through channels 218, grooves 230 and between second collar 138 and pressure tube 30. Flow may not occur through the entire longitudinal extent of the spaces between concave surfaces 210 and piston rod 34 because flow is blocked by second collar 138. Tang 158 is crimped within groove 162 to seal second collar 138 to rod 34 thereby blocking another possible leakage path.

Sealing ring 142 includes a latch 234 at a position where ends of sealing ring 142 are interconnected. A portion of leak path L exists at the location of latch 234. Latch 234 is designed such that unintentional opening of sealing ring 142 due to high hydraulic pressures during the operation of the damper is eliminated.

Figure 8:
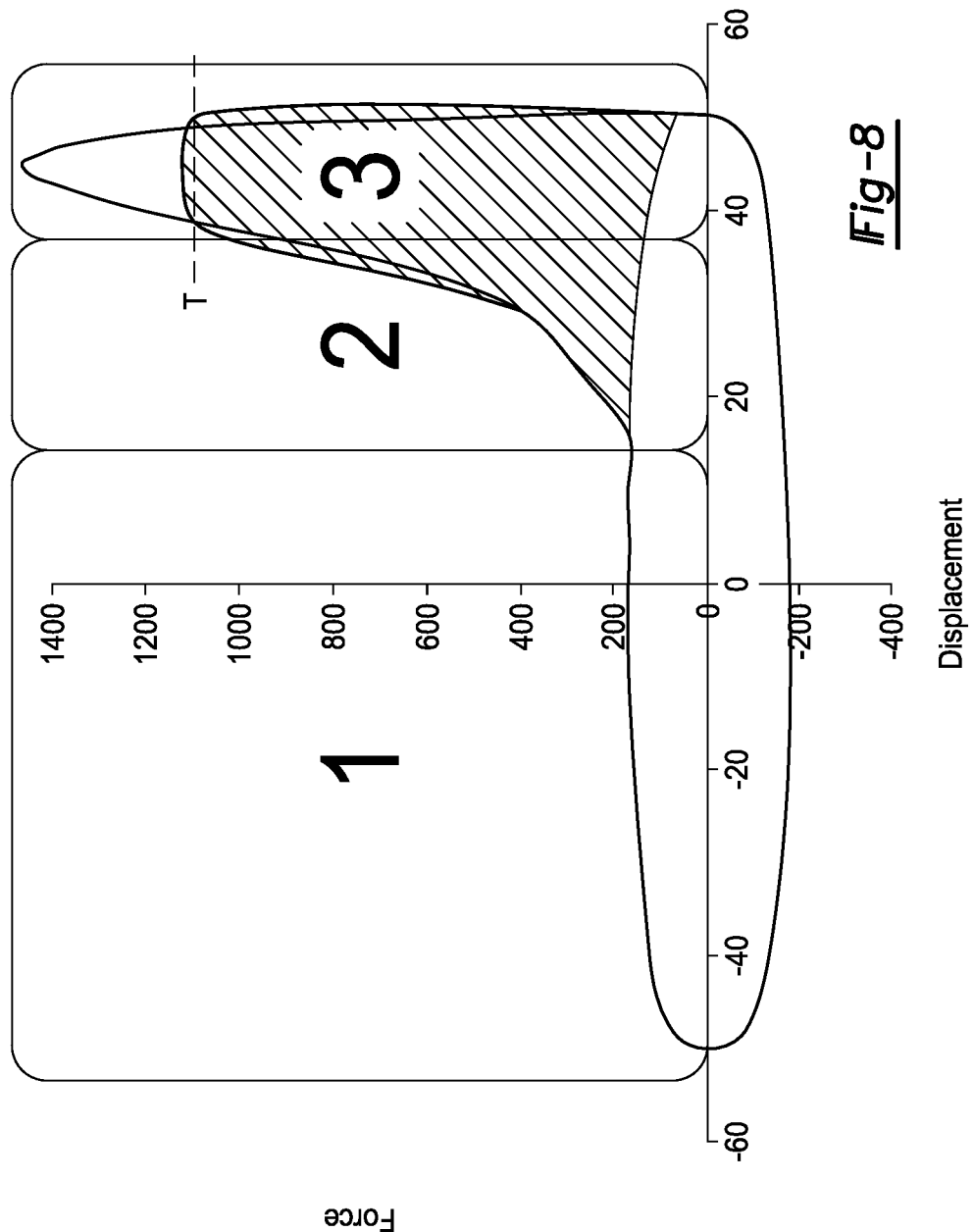
FIG. 8 is a graph depicting force versus displacement including operation of the pressure relief valve.

During the rebound stroke, as hydraulic rebound stop enters reduced diameter portion 185 of pressure tube 30, pressure in high-pressure region 184 increases. Grooves 230 limit flow and facilitate dissipation of kinetic energy. As shown in FIG. 8 and as the rebound stroke continues, the damping force of damper 20 increases and the velocity of the piston rod 34 is reduced. Zone 1 of FIG. 8 represents travel of hydraulic rebound stop 130 in the main portion 187 of pressure tube 30 where the sealing ring 142 is spaced apart from pressure tube 30. Zone 2 depicts hydraulic rebound stop 130 entering the reduced diameter portion 185 of pressure tube 30. A damper designer may define the activation point of the hydraulic rebound stop by varying the length of the reduced diameter portion 185. Once hydraulic rebound stop 130 is operating in Zone 2, flow continues only through paths R and L as long as a pressure differential across sealing ring 142 exists and the maximum pressure within high-pressure region 184 remains below the predetermined threshold.

As the volume of high-pressure region 184 continues to decease during a rebound stroke, damping force and internal pressure continue to increase. At some portion of the rebound stroke, depicted as Zone 3, it may be desirable to limit the maximum pressure within high-pressure region 184 to a threshold pressure, T. The present disclosure provides pressure relief valve 186 to achieve this goal.

Figure 9:
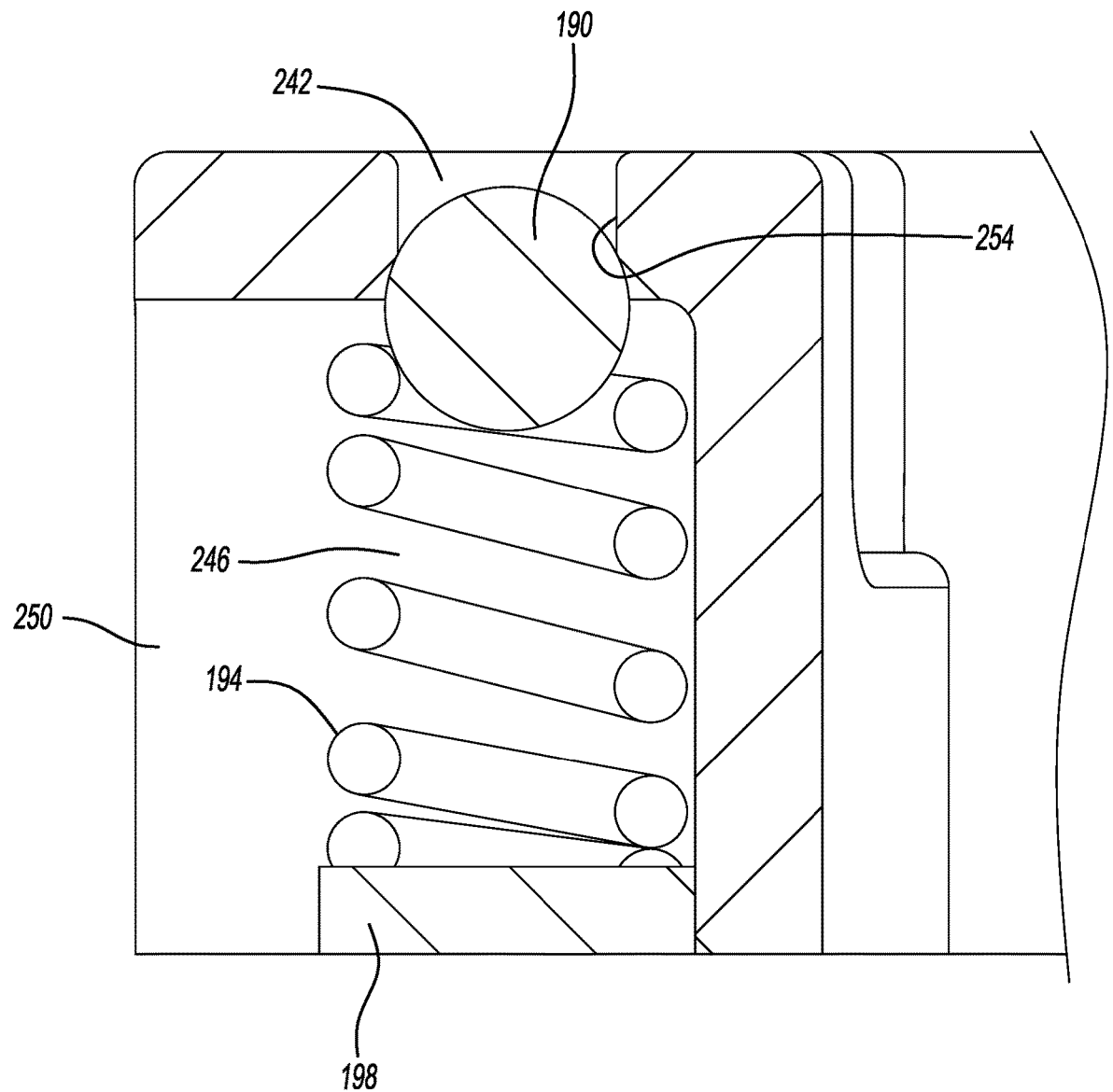
FIG. 9 is an enlarged fragmentary cross-sectional view depicting the pressure relief valve.
Figure 10:
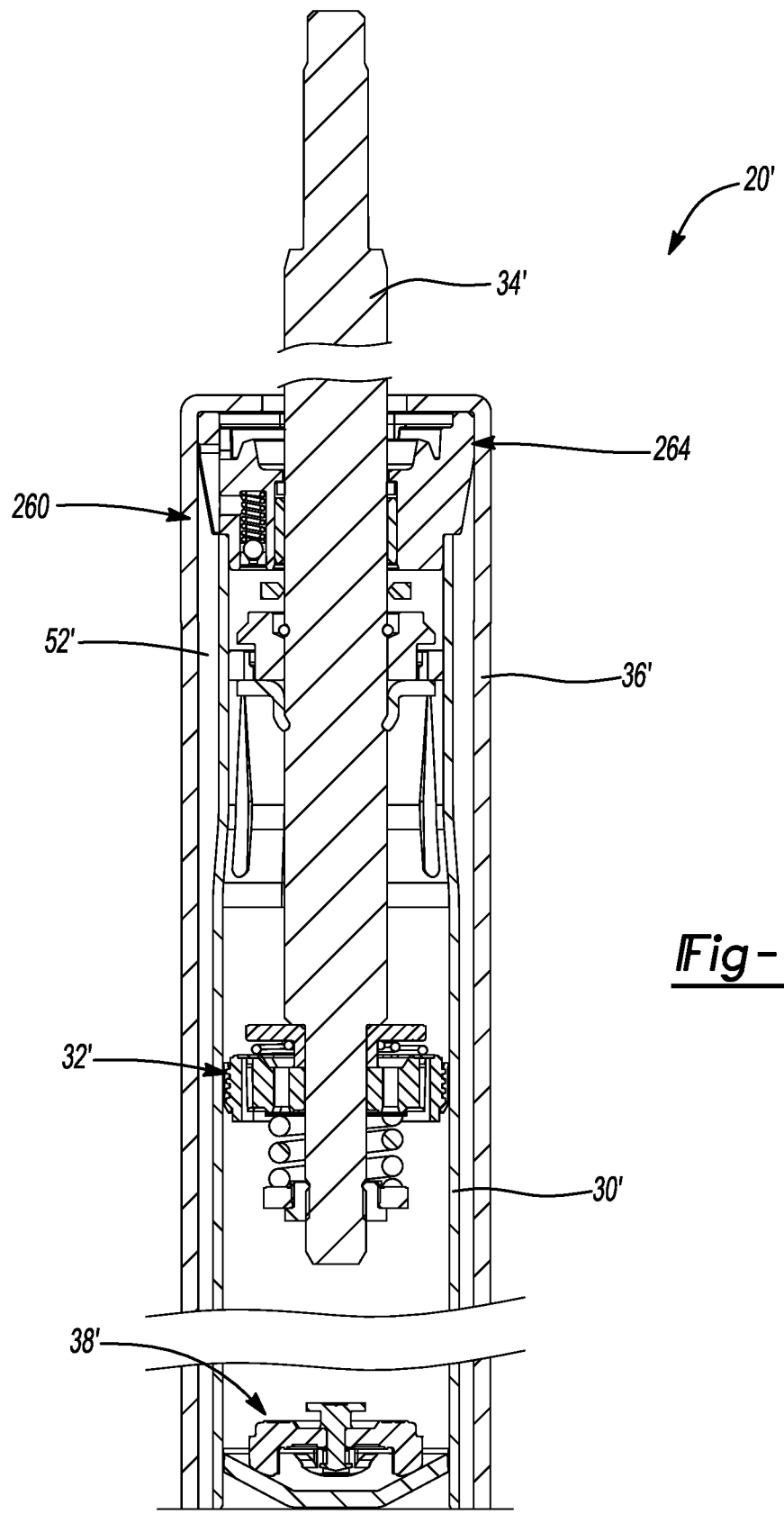
FIG. 10 is a fragmentary cross-sectional view of an alternate embodiment damper.
Figure 11:
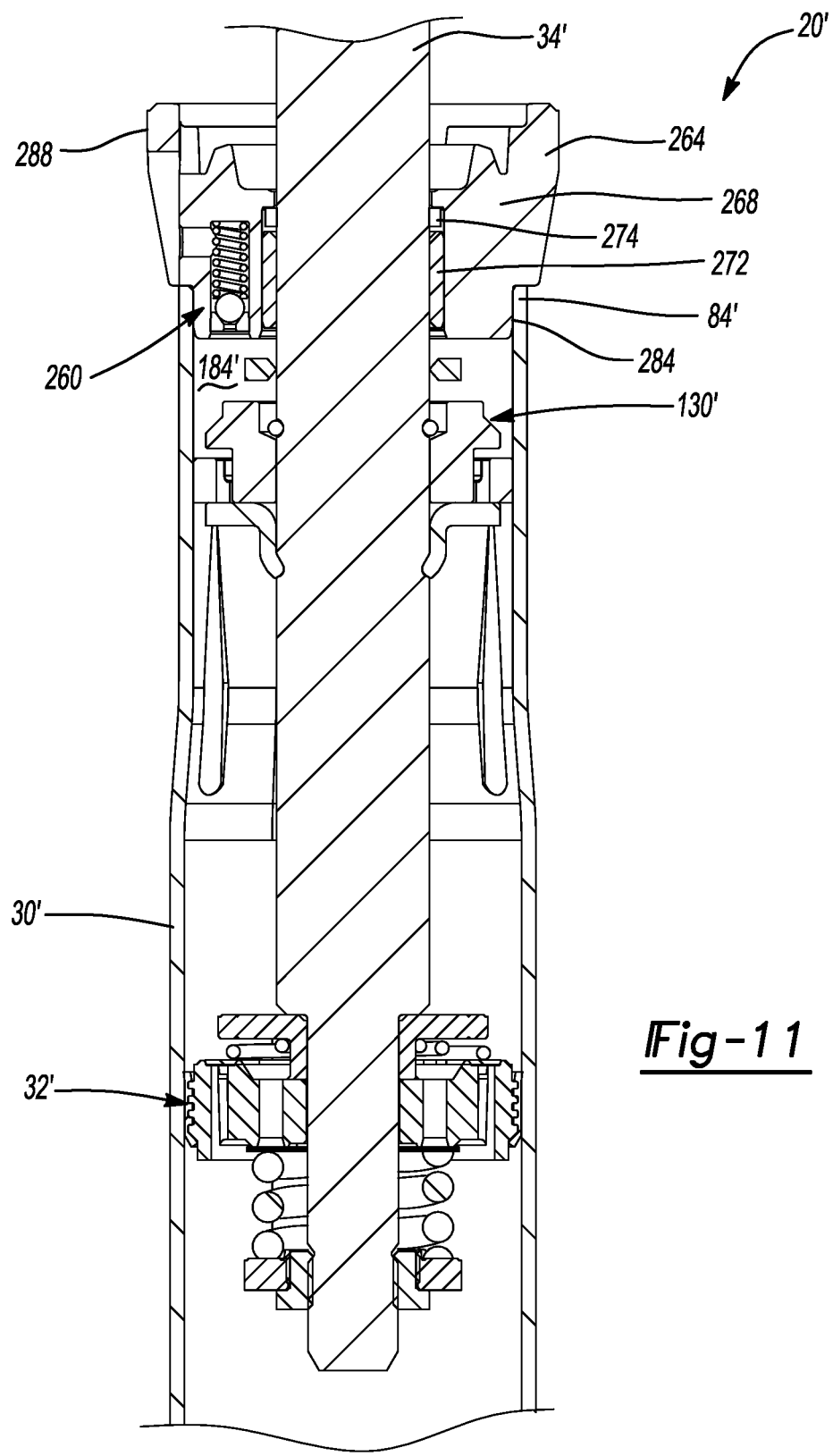
FIG. 11 is a fragmentary cross-sectional view of the damper depicted in FIG. 10.
Figure 12:
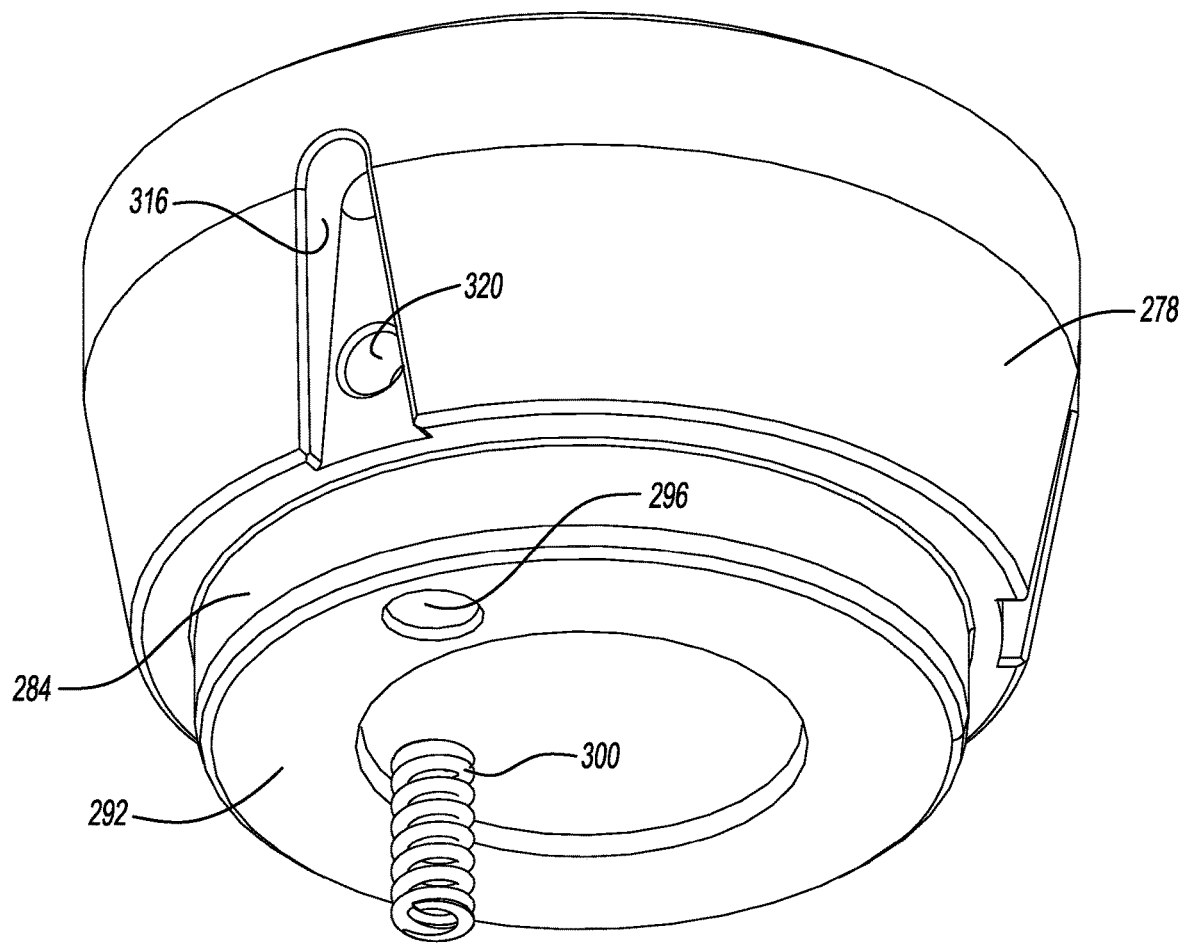
FIG. 12 is an exploded perspective view of a rod guide including a pressure relief valve.
Figure 13:
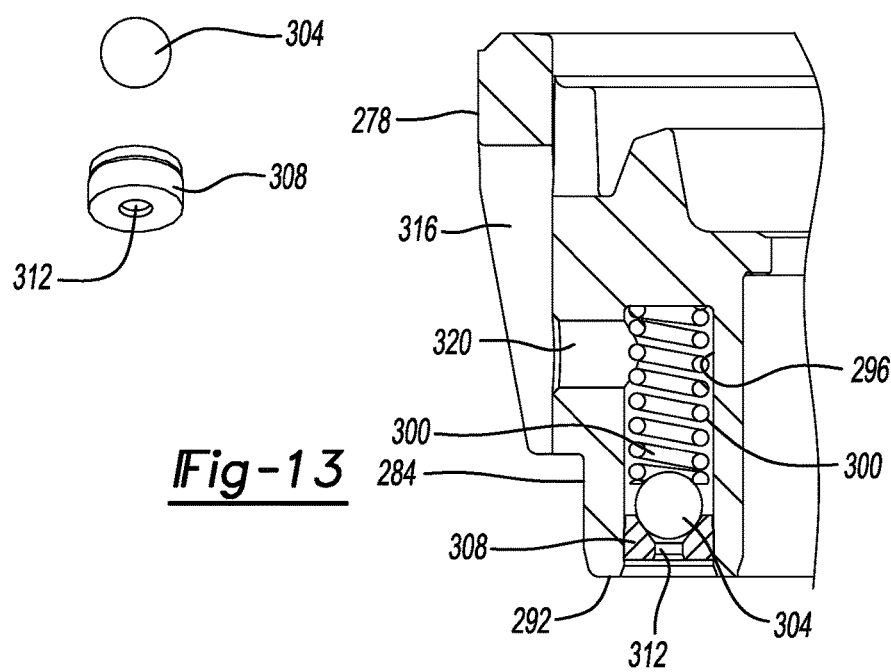
FIG. 13 is a fragmentary cross-sectional view of the rod guide and pressure relief valve.

When the pressure within high-pressure region 184 exceeds the predetermined threshold, pressure relief valve 186 opens to provide a third flow path, "P". In the embodiment shown in FIG. 7, flow path P is provided through features of sealing ring 142. In particular and as shown in FIG. 9, sealing ring 142 includes an inlet port 242, a valve bore 246, and an outlet port 250 all in fluid communication with one another. Valve bore 246 is shaped a counter bore terminating a seat 254. Each of the features of sealing ring 142 including valve bore 246 are aligned to allow simplified plastic injection molding of the sealing ring. First and second injection mold halves (not shown) may be separated along a single axis.

As the pressure within high-pressure region 184 reaches the pressure threshold, check ball 190 is urged to move from its seated positon in engagement with seat 254 to a position offset therefrom. Fluid now passes through path P. The rate and amount of compression of valve spring 194 defines the opening pressure of pressure relief valve 186. When the pressure within high-pressure region 184 reduces below the predetermined threshold pressure, valve spring 194 biases check ball 190 back to the seated position to block flow from passing through pressure relief valve 186. The position of check valve retainer 198 may be used to set the spring preload and the predetermined threshold pressure. It should be appreciated that other pressure relief valves structures are contemplated such as those including discs, spools, and bellows.

During the rebound stroke, sealing ring 142 allows controlled flow of fluid through the first, second, and sometimes third flow paths R, L, P to dissipate kinetic energy thereby eliminating a hard stop of piston rod 34. As previously mentioned, the quantity, shape and size of the various flow path features determine the magnitude of dissipation of kinetic energy. The dissipation of kinetic energy causes reduction in the velocity of the piston rod 34 thereby allowing reduction in noise generated by damper 20 as well as a reduction of forces experienced by various components of the vehicle.

FIGS. 10-13 depict an alternate embodiment damper 20'. Damper 20' is substantially similar to 20 damper except the pressure relief valve has been moved from sealing ring 142 to a rod guide assembly 264. Similar elements will retain like reference numerals including a prime suffix.

During the compression stroke, damper 20' functions substantially similar to damper 20 with regard to the fluid flows previously described across hydraulic rebound stop 130 as and depicted in relation to FIG. 5. In this second embodiment, a pressure relief valve 260 is positioned within a rod guide assembly 264. Pressure relief valve 260 remains closed during the compression stroke.

Rod guide assembly 264 includes a body 268, a bushing 272, and a seal 274 in sliding receipt of piston rod 34'. Body 268 includes an external circumferentially extending surface 278. One portion of external surface 278 is shaped as a reduced diameter snout 284. Snout 284 is sized and shaped to sealingly engage first pressure tube end 84'. Another cylindrically shaped portion of outer surface 278 is identified at reference numeral 288 and is sealingly engaged by reserve tube 36'.

Snout 284 includes an end face 292 through which a valve bore 296 extends. Pressure relief valve 260 includes a check valve spring 300, a check valve ball 304, and a check valve retainer 308 each positioned within the valve bore 296. Check valve retainer 308 includes a through bore 312 that functions as an inlet to the pressure relief valve 260. A radially inwardly extending slot 316 is formed on external surface 278 of rod guide body 268. Radially extending slot 316 extends in fluid communication with reservoir chamber 52'. An outlet port 320 radially extends through rod guide body 268 to place slot 316 and reservoir chamber 52' in fluid communication with valve bore 296. Check valve retainer 308 is fixed to rod guide body 268 at a location to impart a preload on check valve spring 300. The preload, as previously described, defines a predetermined opening pressure for pressure relief valve 260. When a pressure greater than the predetermined opening pressure exists at inlet port 312 and acts check valve ball 304, check valve ball 304 moves from its seat in engagement with check valve retainer 308 to open the pressure relief valve and allow fluid communication between high-pressure region 184' and reservoir chamber 52'.

During a compression stroke, fluid flows through hydraulic rebound stop 130' according to flows R and L as previously described and depicted in relation to FIG. 6. When the pressure within high-pressure region 184' exceeds the predetermined threshold, the third flow P passes through rod guide body 268 via pressure relief valve 260. Once the pressure differential across pressure relief valve 260 reduces in magnitude below the threshold pressure, check valve ball 304 is urged toward the seated position in engagement with check valve retainer 308 and fluid flow is no longer allowed along path P.

Modifications and variations of the present disclosure are possible in light of the above teachings and may be practiced otherwise than as specifically described while within the scope of the appended claims.

What is claimed is:

1. A damper comprising:
   a pressure tube extending longitudinally between a first pressure tube end and a second pressure tube end;
   a piston arranged in sliding engagement inside said pressure tube;
   said piston dividing said pressure tube into a first working chamber and a second working chamber;
   a piston rod coupled to said piston to form a piston rod assembly;
   a rod guide coupled to the first pressure tube end, the piston rod extending through an aperture in the rod guide;
   a hydraulic rebound stop positioned in the first working chamber and including a sealing ring circumferentially extending around the piston rod and within the pressure tube, the sealing ring at least partially defining a high-pressure region within the pressure tube during a rebound stroke;
   a pressure relief valve in fluid communication with the high-pressure region, the pressure relief valve being operable to allow pressurized fluid from the high-pressure region to pass therethrough once a predefined pressure threshold has been reached, wherein the pressure relief valve is positioned within the rod guide.

2. The damper of claim 1, wherein the sealing ring includes an inner surface facing the piston rod, the inner surface including a plurality of concave surfaces and a plurality of convex surfaces, wherein a fluid passageway exists between an external surface of the piston rod and the concave surfaces.

3. The damper of claim 2, wherein the sealing ring includes a plurality of circumferentially spaced apart channels extending between the inner surface of the sealing ring and an outer diametrical surface of the sealing ring.

4. The damper of claim 1, further including a first collar coupled to the piston rod and a second collar spaced apart from the first collar, the second collar being fixed to the piston rod for longitudinal movement therewith, wherein the sealing ring is longitudinally movable relative to the piston rod and longitudinally positioned between the first collar in the second collar.

5. The damper of claim 1, wherein when the pressure relief valve includes a check ball, a spring and a retainer.

6. The damper of claim 1, wherein the high-pressure region is located between the sealing ring and the rod guide.

7. The damper of claim 1, further including a reserve tube circumferentially surrounding the pressure tube, wherein the pressure relief valve selectively allows fluid flow between the high-pressure region within the pressure tube to a reservoir chamber located between the pressure tube and the reserve tube.

8. A damper comprising:
   a pressure tube extending longitudinally between a first pressure tube end and a second pressure tube end, the pressure tube defining a first portion having a first inner diameter and a second portion having an inner diameter sized less than the first portion;
   a piston arranged in sliding engagement inside the pressure tube, the piston dividing the pressure tube into a first working chamber and a second working chamber;
   a piston rod coupled to the piston to form a piston rod assembly;
   a rod guide coupled to the first pressure tube end, the piston rod extending through an aperture in the rod guide;
   a hydraulic rebound stop positioned in the first working chamber and including a sealing ring circumferentially extending around the piston rod and within the pressure tube, the sealing ring at least partially defining a high-pressure region within the second portion of the pressure tube during a rebound stroke; and
   a pressure relief valve in fluid communication with the high-pressure region, the pressure relief valve being positioned in the rod guide and operable to allow pressurized fluid from the high-pressure region to pass therethrough once a predefined pressure threshold has been reached.

9. The damper of claim 8, wherein the sealing ring does not define a high-pressure region when positioned within the first portion of the pressure tube.

10. The damper of claim 8, further including a first collar coupled to the piston rod and a second collar spaced apart from the first collar, the second collar being fixed to the piston rod for longitudinal movement therewith, wherein the sealing ring is longitudinally movable relative to the piston rod, the first collar and the second collar, the sealing ring being captured between the first collar and the second collar.

11. The damper of claim 8, wherein the pressure relief valve includes a check ball, a spring and a retainer.

12. The damper of claim 8, wherein the high-pressure region is longitudinally located between the sealing ring and the rod guide.

13. The damper of claim 8, further including a reserve tube circumferentially surrounding the pressure tube, wherein the pressure relief valve selectively allows fluid flow between the high-pressure region within the pressure tube to a reservoir chamber located between the pressure tube and the reserve tube.

14. The damper of claim 13, wherein the rod guide includes a valve bore and the pressure relief valve includes a check ball, a spring and retainer positioned within the valve bore.

15. A damper comprising:
- a pressure tube extending longitudinally between a first pressure tube end and a second pressure tube end, the pressure tube defining a first portion having a first inner diameter and a second portion having an inner diameter sized less than the first portion;
- a piston arranged in sliding engagement inside the pressure tube, the piston dividing the pressure tube into a first working chamber and a second working chamber;
- a piston rod coupled to the piston to form a piston rod assembly;
- a rod guide coupled to the first pressure tube end, the piston rod extending through an aperture in the rod guide;
- a hydraulic rebound stop positioned in the first working chamber and including a sealing ring circumferentially extending around the piston rod and within the pressure tube, the sealing ring at least partially defining a high-pressure region within the second portion of the pressure tube during a rebound stroke;
- a pressure relief valve in fluid communication with the high-pressure region, the pressure relief valve being positioned in the rod guide and operable to allow pressurized fluid from the high-pressure region to pass therethrough once a predefined pressure threshold has been reached; and
- a reserve tube circumferentially surrounding the pressure tube, wherein the pressure relief valve selectively allows fluid flow between the high-pressure region within the pressure tube to a reservoir chamber located between the pressure tube and the reserve tube, wherein the rod guide includes a valve bore and the pressure relief valve includes a check ball, a spring and retainer positioned within the valve bore, wherein the rod guide includes an external surface in engagement with the reserve tube and the rod guide includes an external slot in fluid communication with the reservoir chamber.

\* \* \* \* \*